United States Patent [19]

Sadamatsu

[11] Patent Number: 5,391,944
[45] Date of Patent: Feb. 21, 1995

[54] IMAGE-TONE CONTROL CIRCUIT AND GRADIENT ADJUSTING CIRCUIT THEREFOR

[75] Inventor: Hideaki Sadamatsu, Hirakata, Japan

[73] Assignee: Matsushita Electric Industrial Co., Ltd., Kadoma, Japan

[21] Appl. No.: 986,049

[22] Filed: Dec. 10, 1992

[30] Foreign Application Priority Data

Jan. 22, 1992 [JP] Japan .................. 4-008929

[51] Int. Cl.[6] .............................................. H03K 5/12
[52] U.S. Cl. ..................... 327/65; 327/170; 327/66; 327/67; 327/306
[58] Field of Search ............ 307/360, 361, 362, 494, 307/263, 268; 358/168, 169; 328/184, 185

[56] References Cited

U.S. PATENT DOCUMENTS

| | | | |
|---|---|---|---|
| 4,523,105 | 6/1985 | Jose et al. | 307/494 |
| 4,591,796 | 5/1986 | Muller-Girard et al. | 328/184 |
| 5,045,732 | 9/1991 | Sugiura et al. | 307/360 |
| 5,053,650 | 10/1991 | Ohkubo et al. | 307/521 |
| 5,115,154 | 5/1992 | Terado | 307/494 |
| 5,136,184 | 8/1992 | Deevy | 307/494 |
| 5,162,902 | 11/1992 | Bell et al. | 358/168 |
| 5,191,420 | 3/1993 | Lagoni et al. | 358/168 |
| 5,196,937 | 3/1993 | Kageyama | 358/168 |
| 5,223,927 | 6/1993 | Kageyama et al. | 358/168 |
| 5,258,658 | 11/1993 | Morikawa | 307/263 |
| 5,262,862 | 11/1993 | Sadamatsu et al. | 358/169 |

FOREIGN PATENT DOCUMENTS 54-80754  6/1979  Japan .

Primary Examiner—Timothy P. Callahan
Assistant Examiner—T. T. Lam
Attorney, Agent, or Firm—Cushman, Darby & Cushman

[57] ABSTRACT

In a tone control circuit of luminance signals, an adjusting current is used to add to or subtract from input signals with a gain control. Output signals are thus controlled to have a predetermined gradient based on an arbitrary output setting voltage against the input signals, and an input-output characteristic represented by an arbitrary line graph is obtained by plural gradient adjusting circuits.

10 Claims, 6 Drawing Sheets

IMAGE-TONE CONTROL CIRCUIT AND GRADIENT ADJUSTING CIRCUIT THEREFOR

FIELD OF THE INVENTION AND RELATED ART STATEMENT

1. Field of the Invention

The present invention relates to the tone control of a TV etc. image. More particularly it relates to a flexible tone control circuit such as a fuzzy control.

2. Description of the Related Art

The conventional tone control circuit for luminance signals is disclosed, for example, in Japanese unexamined patent application (TOKKAI) HEI 4-37283.

FIG. 5 is a circuit diagram showing the above-mentioned conventional tone control circuit for the luminance signals, and FIG. 6 is a graph showing a characteristic of the tone control circuit shown in FIG. 5.

In FIG. 5, transistors 102, 104, 109, 111, 121 and 122 are of NPN type, and transistors 106, 107, 113, 114, 116 and 119 are of PNP type. The tone control circuit consists of transistors 102, 104, 106, 107, 109, 111, 113, 114, 116, 119, 121, 122, resistors 103, 110, 117, 118, 123 and the below-mentioned seven voltage or current sources. A voltage source 101 supplies the base of the transistor 102 with a constant DC voltage $V_A$. Another voltage source 108 supplies the base of the transistor 109 with a constant DC voltage $V_B$. The base of the transistor 111 is connected to a luminance signal voltage source 124. A voltage source 115 supplies the base of transistor 116 with a constant DC voltage. A control voltage source 120 supplies the base of transistor 119 with a control voltage. The emitters of the transistors 102 and 109 are connected to constant current sources 105 and 112, respectively.

In the above-mentioned conventional tone control circuit, when the luminance signal voltage $V_{sig}$ exceeds the voltage $V_A$ of the voltage source, 101, a current flows through the transistor 104. The amount of current flowing is obtained by dividing a difference in voltage between the luminaries signal voltage $V_{sig}$ and the voltage $V_A$ by the resistance value of the resistor 103. When the luminance signal voltage $V_{sig}$ further increases and thereby also exceeds the voltage $V_B$, a current also flows through transistor 111. The amount of current flowing through transistor 111 is obtained by dividing the difference in voltage between the luminance signal voltage $V_{sig}$ and the voltage $V_B$ by the resistance value of the resistor 110. The current flowing through transistors 104 and 111 also flows through a current mirror circuit consisting of transistors 106 and 107 and another current mirror circuit consisting of transistors 113 and 114, respectively. The currents flowing through transistors 107 and 114 flows into a differential amplifier consisting of transistors 116, 119 and resistors 117 and 118. This current is controlled to flow in either direction through resistor 123 by the voltage of the control voltage source 120 and a current mirror circuit consisting of transistors 121 and 122. By adding the voltage generated across resistor 123 to the luminance signal voltage $V_{sig}$ of the luminance signal voltage source 124, the relationship between the input signal of the voltage source 124 and the output signal 125 is changed as shown in FIG. 6. In FIG. 6, a straight line represents the proportional relationship (1:1) between the input and the output. The curved solid lines over and below the dotted line represent the characteristics obtained by adding the voltage of resistor 123.

As shown in FIG. 6, once the to relationship differs from 1:1 it never returns to a straight line relationship. Therefore, it is impossible to get a desirable characteristic such that the signal range below the input voltage $V_A$ and a signal range over the input voltage $V_B$ can have gradients which are independent from each other. As a result, it is impossible to realize the optimum control of a signal having a high brightness range with a signal having a low brightness range.

OBJECT AND SUMMARY OF THE INVENTION

An object of the present invention is to offer a tone control circuit, which is capable of furnishing arbitrary gradients in response to a plurality of voltage signals, and a gradient adjusting circuit used for the achievement of this tone control circuit.

In order to achieve the above-mentioned object, the gradient adjusting circuit for the tone control circuit of the present invention comprises a first differential amplifier including a first setting transistor and a second setting transistor, the first setting transistor having a base to which a first input setting voltage $(V_{i0}(=V_p))$ is input, the second setting transistor having a base to which a second input setting voltage $(V_{i1})$ is input and an emitter connected to a first resistor, a current mirror circuit connected to a collector of the second setting transistor, an adjusting current generation circuit for issuing an adjusting current $(i_1)$ based on an output current of the current mirror circuit, a first output resistor, one end of which is connected to the base of the second transistor and the other end of which receives the adjusting current $(i_1)$, an operational amplifier for comparing a voltage $(V_1)$ appearing at the other end of the first output resistor with a second output setting voltage $(V_{o1})$, the operational amplifier feeding back its output signal to the adjusting current generation circuit, a second differential amplifier including a first signal transistor and a second signal transistor, the first signal transistor having an emitter to which a second resistor having a resistance the same as the first resistor is connected, and a base to which an input signal $(Y_{in})$ is input, the second signal transistor having a base to which the first input setting voltage $(V_p)$ is input, a signal current mirror circuit connected to a collector of the first signal transistor, a gradient adjusting current generation circuit for issuing a signal adjusting current $(i_{o1})$ based on an output current of the signal current mirror circuit, the gradient adjusting current generation circuit receiving an output signal fed-back from the operational amplifier in a manner that a gradient of input to output in a range from the first input setting voltage $(V_p)$ to the second input setting voltage $(V_{i1})$ is given by a value of $(V_{o1}-V_p)/(V_{i1}-V_p)$, and a signal output resistor, one end of which receives the input signal $(Y_{in})$ and the other end of which receives the signal adjusting current $(i_{o1})$ to serve as an output end of an output signal $(Y_{out})$.

According to the above-mentioned gradient adjusting circuit for the tone control circuit, the adjusting current obtained in a voltage range starting from the first input setting voltage is used to add to or subtract from the input signal $Y_{in}$ with a gain control. Output signals are thus controlled to have a predetermined gradient based on an arbitrary output setting voltage $V_{on}$, and an input-output characteristic represented by a plurality of an arbitrary line graph is obtainable by gradient adjusting circuits.

While the features of the invention are set forth particularly in the appended claims, the invention, both as to organization and content, will be better understood and appreciated, along with other objects and features thereof, from the following detailed description taken in conjunction with the drawings in which:

DESCRIPTION OF THE PREFERRED EMBODIMENT

Hereafter, a preferred embodiment of the present invention is described with reference to the accompanying drawings.

Figure 1:
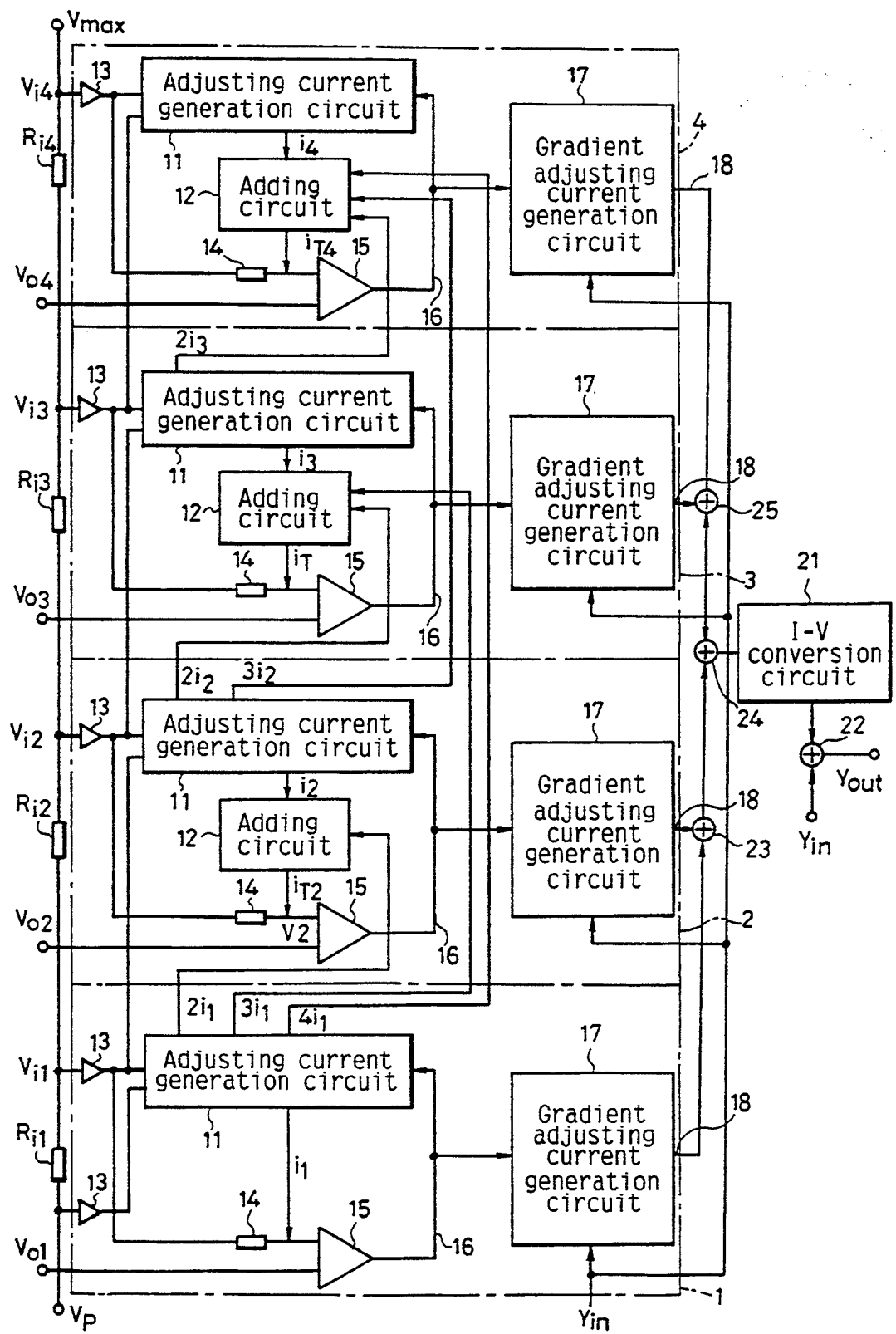
FIG. 1 is a block diagram showing a tone control circuit of the present invention.

Referring to FIG. 1, this embodiment the tone control circuit is constituted by four gradient adjusting circuits denoted by reference numerals 1 to 4, an I-V conversion circuit 21, adders 22 to 25 and resistors $R_{i1}$ to $R_{i4}$ ($R_{i1}=R_{i2}=R_{i3}=R_{i4}$ in resistance). The gradient adjusting circuit 1 consists of an adjusting current generation circuit 11, two buffers 13, a resistor 14, an operational amplifier 15 and a gradient adjusting current generation circuit 17. Each of the gradient adjusting circuits 2, 3 and 4 further includes an adding circuit 12 as well as the same components as gradient adjusting circuit 1, but gradient adjusting circuits 2, 3 and 4 have only one buffer 13.

Next, the operation of the tone control circuit is described. A voltage between the maximum voltage $V_{max}$ (the brightest signal voltage) and the pedestal voltage $V_p(=0)$ is equally divided among resistors $R_{i1}$, $R_{i2}$, $R_{i3}$ and $R_{i4}$ to become input setting voltages $V_{i1}$, $V_{i2}$, $V_{i3}$ and $V_{i4}$, respectively. The input setting voltages $V_{i1}$, $V_{i2}$, $V_{i3}$, $V_{i4}$, the output setting voltages $V_{o1}$, $V_{o2}$, $V_{o3}$, $V_{o4}$ and a signal $Y_{in}$ are input to the gradient adjusting circuits 1 to 4.

In the gradient adjusting circuit 2, the input setting voltages $V_{i1}$ and $V_{i2}$ are input to an adjusting current generation circuit 11 through the buffers 13. The adjusting current generation circuit 11 issues an adjusting current $i_2$ in proportion to the voltage difference between the input setting voltages $V_{i1}$ and $V_{i2}$, and its integer multiples ($2i_2$, $3i_2$, - - -). The current $i_2$ and an adjusting current $2i_1$ of the gradient adjusting circuit 1 are added by an adding circuit 12 in the gradient adjusting circuit 2, which issues an output current $i_{T2}$. The voltage $V_{i2}$ after passing through the buffer 13 and resistor 14 is added to adjusting current $i_{T2}$ to create a voltage $V_2$ to an operational amplifier 15. The operational amplifier 15 compares the voltage $V_2$ with the output setting voltage $V_{o2}$ and issues a control signal 16.

This control signal 16 is fed-back to the adjusting current generation circuit 11. The adjusting current $i_2$ is thus controlled to equalize the voltage $V_2$ with the output setting voltage $V_{o2}$. The control signal 16 is also input to the gradient adjusting current generation circuit 17 of the respective gradient adjusting circuit. An adjusting current 18 is issued from the gradient adjusting current generation circuit 17. The adjusting current 18 serves a gradient of input versus output when the input signal is within a range from $V_{i1}$ to $V_{i2}$. In a similar way, the gradient adjusting circuit 1 converts the input setting voltage $V_{i1}$ to the output setting voltage $V_{o1}$, and the gradient adjusting circuits 3 and 4 convert the input setting voltages $V_{i3}$ and $V_{i4}$ to the output setting voltages $V_{o3}$ and $V_{o4}$, respectively.

Figure 3:
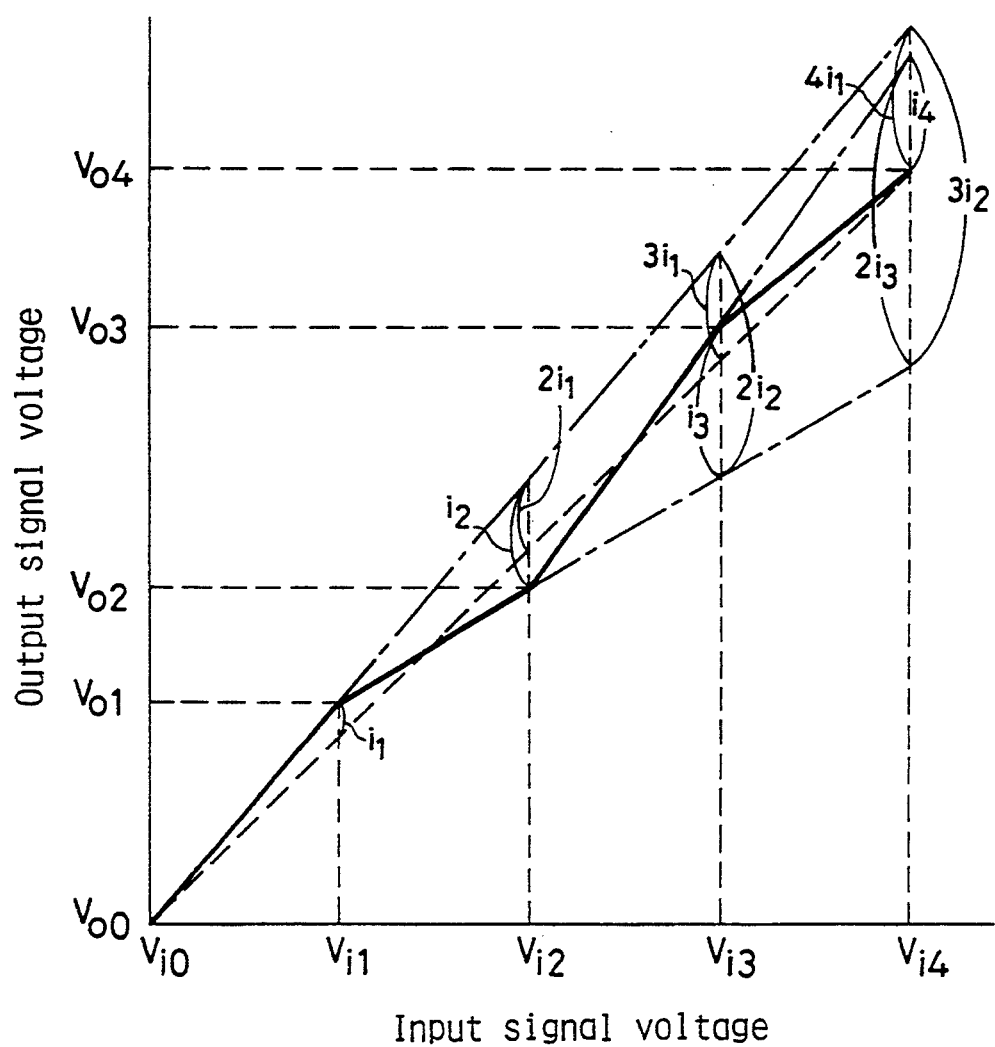
FIG. 3 is a graph showing the input-output characteristics of the tone control circuit shown in FIG. 1.

According to the above-mentioned gradient adjusting by the gradient adjusting circuits 1 to 4, gradient adjusting voltages based on currents $i_1$, $i_2$, $i_3$ and $i_4$ are applied to the input setting voltages $V_{i1}$, $V_{i2}$, $V_{i3}$ and $V_{i4}$ as shown in FIG. 3 (To simplify the description, the adjusting voltage in FIG. 3 is represented by means of the currents $i_1$, $i_2$, $i_3$ and $i_4$). Thus, a graph shown by the solid lines is obtained.

Figure 2:
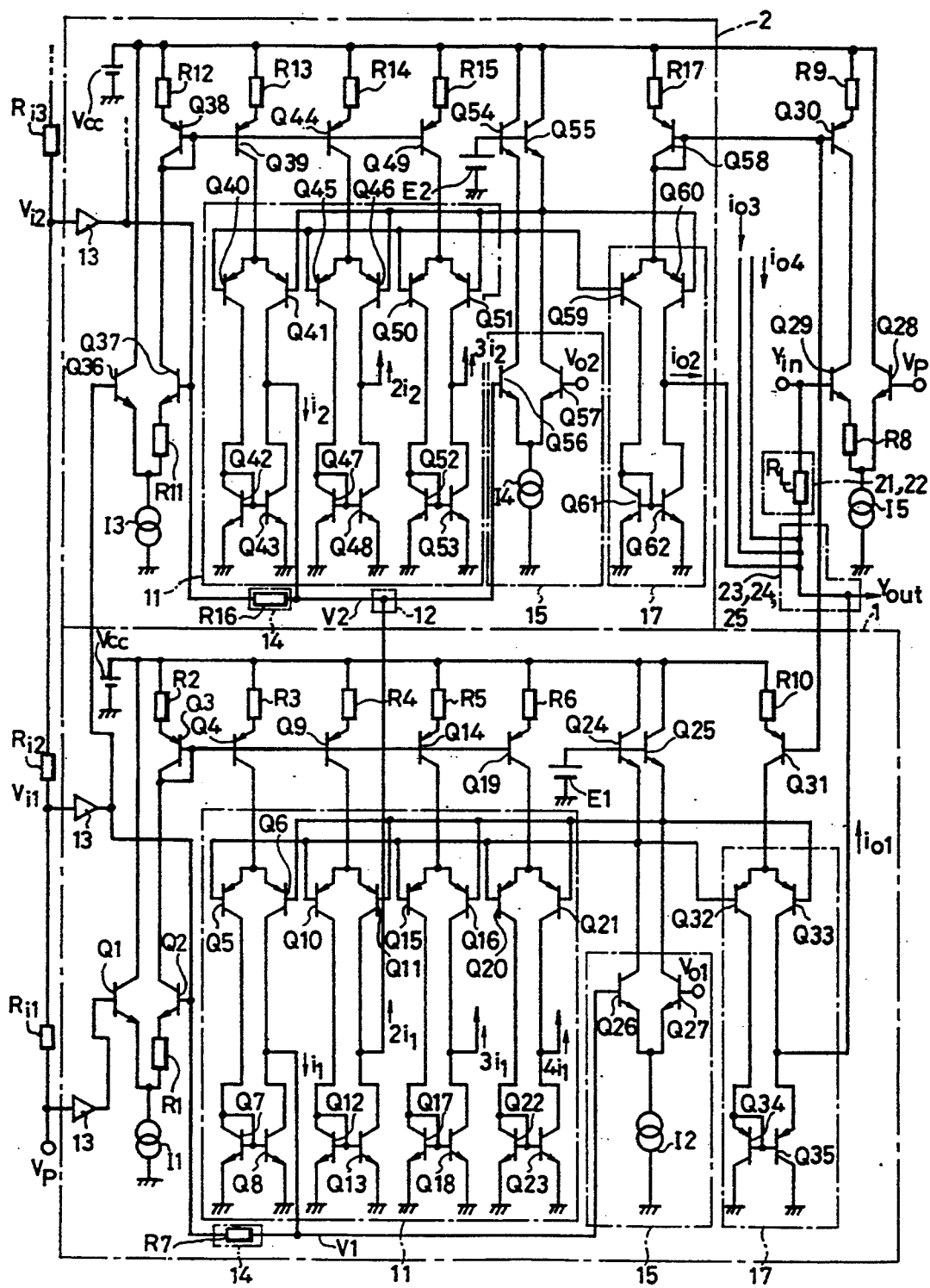
FIG. 2 is a circuit diagram showing one embodiment of the a circuit for a part of the tone control circuit shown in FIG. 1.

Next, an embodiment of the tone control circuit is described with reference to FIGS. 2 and 3. Corresponding parts to those in FIG. 1 are referenced by the same numerals as in FIG. 1. In FIG. 2, the internal circuitry of the gradient adjusting circuits 1 (a lower part enclosed by chain lines) and 2 (an upper part enclosed by chain lines) is shown. The internal circuitry of gradient adjusting circuits 3 and 4 are not shown because they are apparent. The circuit (Q28 to Q30, R8, R9, $R_L$, I5) outside the gradient adjusting circuits 1 and 2 is common to both gradient adjusting circuits 1 and 2.

The circuit shown in FIG. 2 includes transistors Q1 to Q65, resistors R1 to R17 and $R_L$, current sources I1 to I8 and voltage sources E1 and E2. The pedestal voltage $V_p$ is supplied to the base of transistor Q1 as a first input setting voltage through a buffer 13. The input setting voltage $V_{i1}$ is supplied to the bases of transistor Q2 (in the gradient adjusting circuit 1) and transistor Q36 (in the gradient adjusting circuit 2) as a second input setting voltage through a buffer 13. The input setting voltage $V_{i2}$ is supplied to the base of transistor Q37 as a third input setting voltage through a buffer 13. The output setting voltages $V_{o1}$ and $V_{o2}$ are supplied to the bases of transistor Q27 (in the gradient adjusting circuit 1) and transistor Q57 (in the gradient adjusting circuit 2) as a second output setting voltage and a third output setting voltage, respectively. A first output setting voltage $V_{o0}$(shown in FIG. 3) is equal to the pedestal voltage $V_p(=0)$. An input signal $Y_{in}$ is supplied to the base of transistor Q29.

Operation of the gradient adjusting circuit 1 is now described. The second input setting voltage $V_{i1}$ is compared with the pedestal voltage (the first input setting voltage) $V_p$ by a differential amplifier constituted by transistors Q1, Q2, the resistor R1 and the current source I1. This differential amplifier causes a current of $(V_{i1}-V_p)/R1$ to flow through the collector of transistor Q2. This current brings also flows through the collector of transistor Q4 by means of a current mirror circuit consisting of transistors Q3, Q4, and resistors R2 and R3 (R3=R2 in resistance). Furthermore, an adjusting current $i_1$ is generated by a differential amplifier consisting of transistors Q5 and Q6, and a current mirror circuit consisting of transistors Q7 and Q8. The differential amplifier and current mirror circuit constitute an adjusting current generation circuit. The adjusting current $i_1$ flows in resistor R7 which is impressed with the input setting voltage $V_{i1}$, thereby adding the voltage appearing across resistor R7 to the input setting voltage $V_{i1}$. And supplying it to a differential amplifier consisting of transistors Q26 and Q27, and is compared with the output setting voltage $V_{o1}$. Output voltages are generated at the emitters of transistors Q24 and Q25. These output voltages are fed-back to the differential amplifier consisting of transistors Q5 and Q6, so that the adjusting current $i_1$ may be controlled to equalize voltage $V_1$ with voltage $V_{o1}$. Resistor R4 ($=$R2/2 in resistance) and transistor Q9 constitute another current mirror circuit to resistor R2 and transistor Q3. Similarly, resistor R5 ($=$R2/3 in resistance) and transistor Q14 constitute another current mirror circuit to resistor R2 and transistor Q3, as above. Also, resistor R6 ($=$R2/4 in resistance) and transistor Q19 constitute the other current mirror circuit to resistor R2 and the transistor Q3. As a result of the above-mentioned selection of the resistance for the resistor R4, an adjusting current $2i_1$ is generated by a differential amplifier consisting of transistors Q10 and Q11 and its current mirror circuit consisting of transistors Q12 and Q13. These differential amplifier and current mirror circuits constitute another adjusting current generation circuit for generating the adjusting current $2i_1$. In a similar way, another adjusting current generation circuit for generating the adjusting current $3i_1$ is constituted by a differential amplifier consisting of transistors Q15 and Q16, and a current mirror circuit consisting of transistors Q17 and Q18. Further, the other adjusting current generation circuit for generating the adjusting current $4i_1$ is constituted by a differential amplifier consisting of the transistors Q20 and Q21 and a current mirror circuit consisting of transistors Q22 and Q23.

Input signal $Y_{in}$ is compared with the pedestal voltage $V_p$ at a differential amplifier consisting of transistors Q28, Q29, resistor R8($=$R1 in resistance) and current source I5, and a current of $(Y_{in}-V_p)/R8$ flows through the collector of transistor Q29. A current of $(Y_{in}-V_p)/R8$ thereby flows through the collector of transistor Q31 by means of a current mirror circuit consisting of transistors Q30, Q31 and resistors R9, R10($=$R9 in resistance). By the operation of a differential amplifier consisting of transistors Q32 and Q33 and a current mirror circuit consisting of the transistors Q34 and Q35, a signal adjusting current $i_{o1}$ flows into resistor $R_L$ ($=$R7/R16 in resistance) in response to control voltages of the emitters of transistors Q24 and Q25 so that the output signal voltage may be $V_{o1}$ by the gradient adjusting current $i_1$ when the input signal voltage is $V_{i1}$. An output signal $Y_{out}$ arises at one end of resistor $R_L$ as shown in FIG. 2. Thus, the input-output characteristics due to the input signal voltage $V_{i1}$ (from $V_{i0}$ to $V_{i1}$) is obtained as shown by the first solid line in FIG. 3. That is, a gradient of input-output in a range from the input signal voltage $V_{i0}$ to the input signal voltage $V_{i1}$ has a value of $(V_{o1}-V_p)/(V_{i1}-V_p)$.

The operation of the gradient adjusting circuit 2 is now described. The third input setting voltage $V_{i2}$ and the second input setting voltage $V_{i1}$ are compared with each other by a differential amplifier consisting of transistors Q36, Q37 and resistor R11($=$R8 in resistance), and thereby a current of $(V_{i2}-V_{i1})/R11$ flows in the collector of transistor Q37. The same amount of current flows in the collector of transistor Q39 by a current mirror circuit consisting of transistors Q38, Q39, resistors R12 and R13 (R12$=$R13 in resistance). Further, an adjusting current $i_2$ is issued by a differential amplifier consisting of transistors Q40, Q41 and a current mirror circuit consisting of transistors Q42 and Q43. The adjusting current $i_2$ and the adjusting current $2i_1$ in the gradient adjusting circuit 1 flow in the resistor R16 which is impressed with the voltage $V_{i2}$, thereby producing an addition of voltage. A resultant voltage $V_2$ is compared with voltage $V_{o2}$ by a differential amplifier consisting of transistors Q56 and Q57, while transistors Q56 and Q57 supply the emitters of transistors Q54 and Q55 with output voltages. As a result of feed-back of these output voltages to the differential amplifier consisting of transistors Q40 and Q41, the adjusting current $i_2$ is controlled so that voltages $V_2$ and $V_{o2}$ should be equal to each other. On the other hand, resistor R14 ($=$R12/2 in resistance) and transistor Q44 constitute another current mirror circuit to the resistor R12 and transistor Q38, and resistor R15 ($=$R12/3 in resistance) and transistor Q49 constitute another current mirror circuit to the same circuit as above. As a result of the above-mentioned selection of the resistance for resistor R14, an adjusting current $2i_2$ is generated by a differential amplifier consisting of transistors Q45 and Q46 and a current mirror circuit consisting of the transistors Q47 and Q48. These differential amplifier and current mirror circuits constitute another adjusting current generation circuit for generating the adjusting current $2i_2$. In a similar way to the above, the other adjusting current generation circuit for generating the adjusting current $3i_2$ is constituted by a differential amplifier consisting of transistors Q50 and Q51 and a current mirror circuit consisting of transistors Q52 and Q53. The input signal $Y_{in}$ is compared with the pedestal voltage $V_p$ by the differential amplifier consisting of transistors Q28, Q29, resistor R8 and the current source I5, thereby causing a current of $(Y_{in}-V_p)/R8$ flow in the collector of transistor Q29. A similar current $(Y_{in}-V_p)/R8$ flows in the collector of transistor Q58 by a current mirror circuit consisting of transistors Q30, Q58 and resistors R9 and R17 (R17$=$R9 in resistance). By operations the operation of a differential amplifier consisting of transistors Q59 and Q60 and a current mirror circuit consisting of transistors Q61 and Q62, a signal adjusting current $i_{o2}$ flows into the resistance $R_L$ in response to control voltages of the emitters of transistors Q54 and Q55 so that the output voltage may be $V_{o2}$ by the gradient adjusting current $(2i_1+i_2)$ when the input signal voltage is $V_{i2}$. The output signal $Y_{out}$ arises at one end of resistor $R_L$ as shown in FIG. 2. Thus, the input-output characteristics within the range of from voltage $V_{i1}$ to voltage $V_{i2}$ is obtained as shown by the second solid line in FIG. 3. That is, the gradient of input-output in the range from an input signal voltages of $V_{i1}$ to an input signal voltage of $V_{i2}$ has a value of $(V_{o2}-V_{o1})/(V_{i2}-V_{i1})$.

In a similar way to the above, an adjusting current $(3i_1+2i_2+i_3)$ flows in gradient adjusting circuit 3 (shown in FIG. 1) as a load current, thereby causing an addition for converting the input voltage $V_{i3}$ into the output voltage $V_{o3}$. Also, an adjusting current $(4i_1+3i_2+2i_3+i_4)$ flows in gradient adjusting circuit 4 (FIG. 1) as a load current, thereby causing an addition for converting the input voltage $V_{i4}$ into the output voltage $V_{o4}$.

Thus, the input-output characteristics within the range from voltage $V_{i0}$ to voltage $V_{i4}$ is obtained as shown by the solid lines in the graph of FIG. 3.

Figure 4:
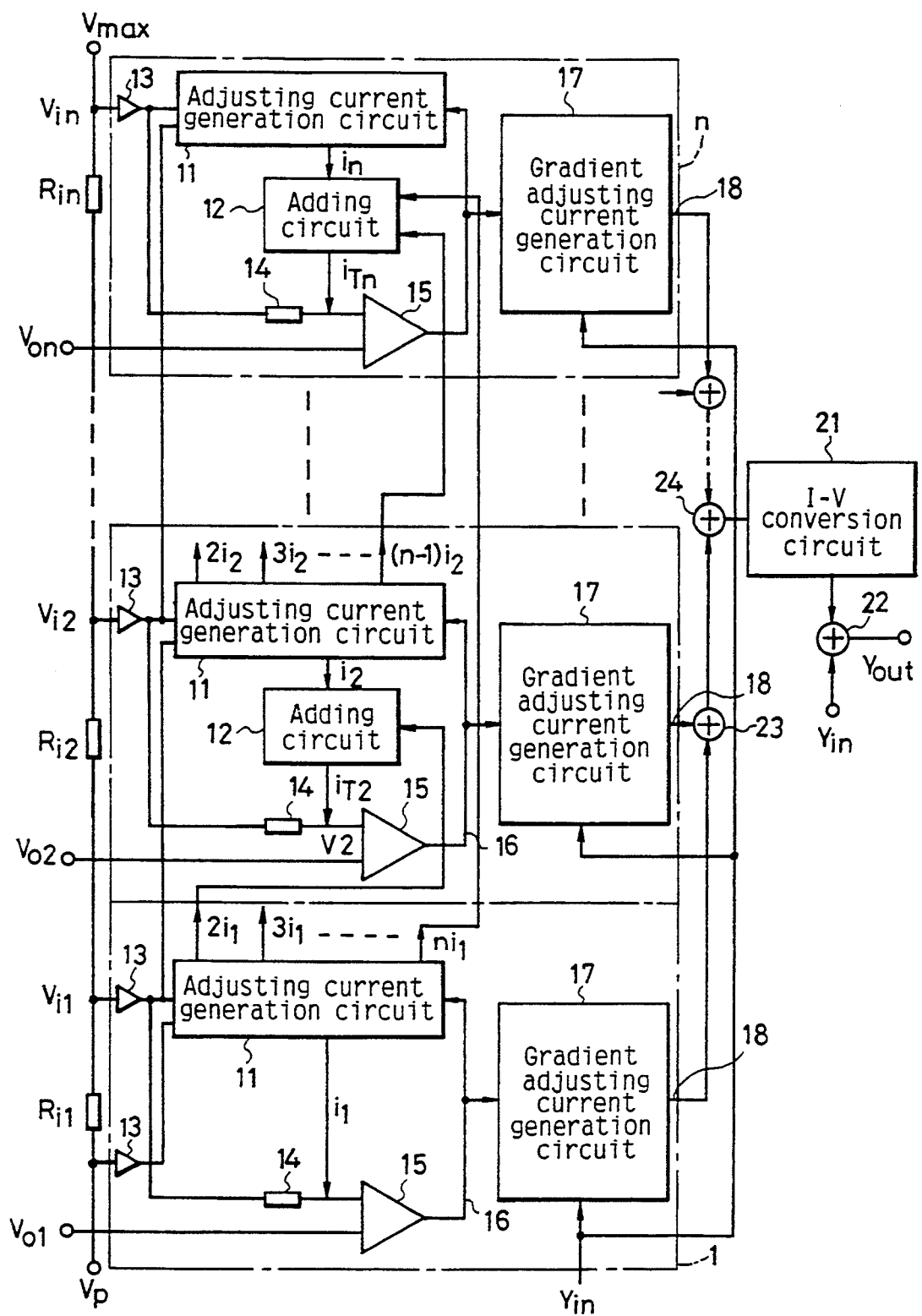
FIG. 4 is a block diagram showing a general circuit construction of a tone control circuit according to the present invention.
Figure 5:
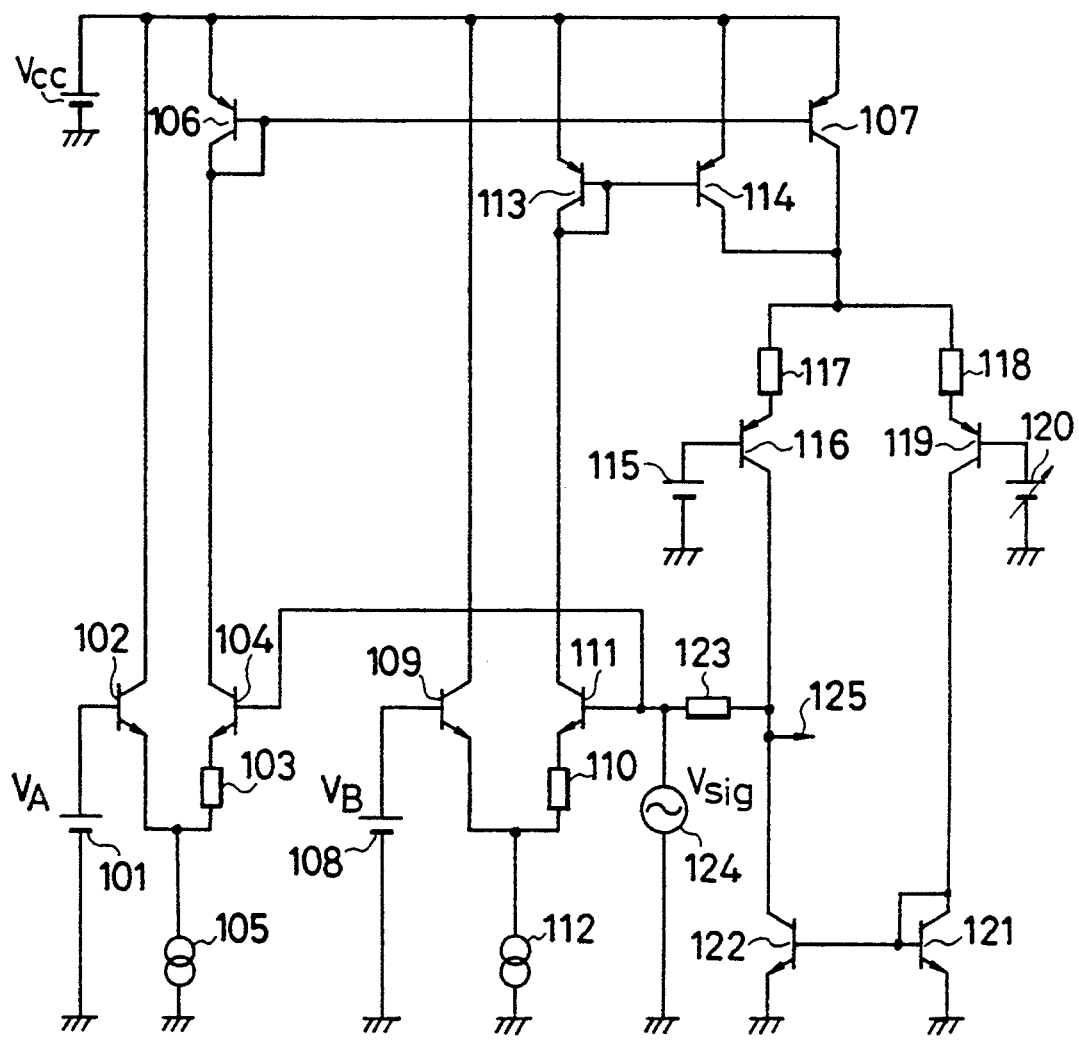
FIG. 5 is a circuit diagram showing a conventional tone control circuit.
Figure 6:
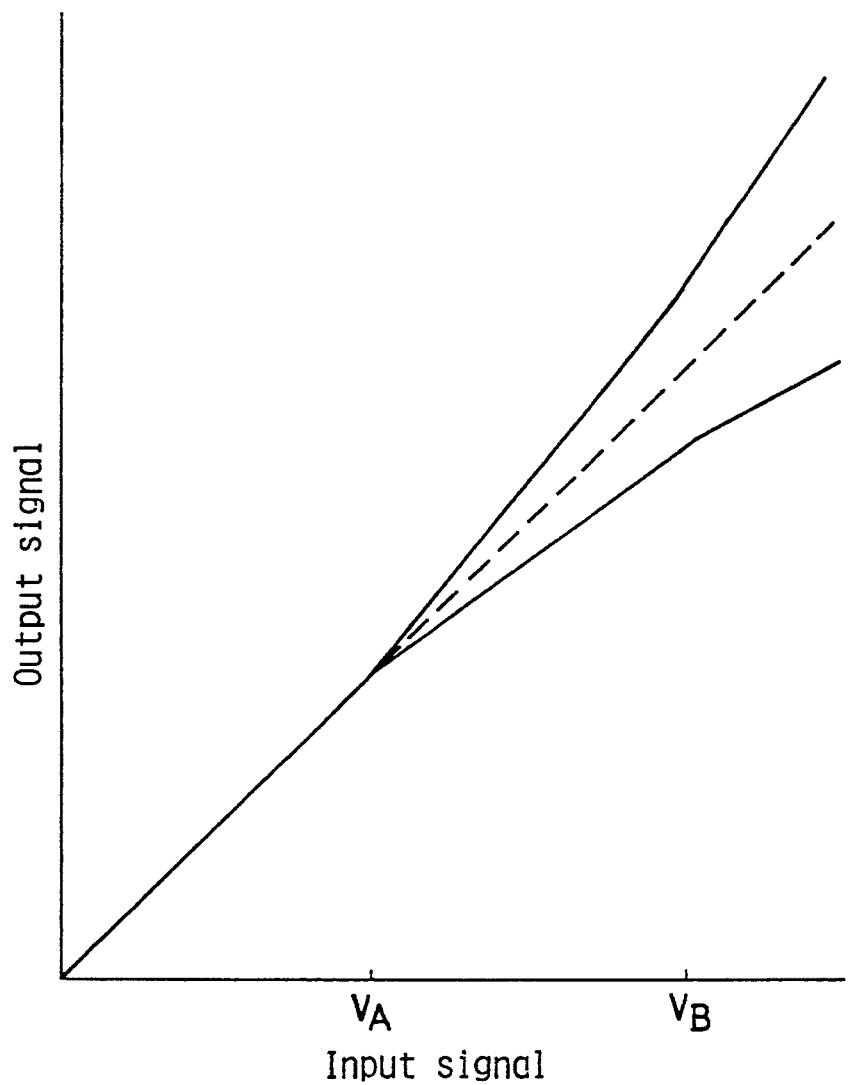
FIG. 6 is a graph showing the characteristics of the tone control circuit shown in FIG. 5.

In the above-mentioned embodiment, there are provided four gradient adjusting circuits 1 to 4. However, number of the gradient adjusting circuits is not limited to four. FIG. 4 is a block diagram showing the general construction of a tone control circuit having n gradient adjusting circuits 1 to n (where n is a positive integer larger than 2).

As has been described above, the adjusting current, which is obtained in a voltage range starting from the first input setting voltage, is used to add to or subtract from the input signal $Y_{in}$ with a gain control. Output signals are thus controlled to have a predetermined gradient based on an arbitrary output setting voltage $V_{on}$, and an input-output characteristic represented by an arbitrary line graph is obtainable by plurality of gradient adjusting circuits.

In FIG. 1, when the input signal range is divided into four ranges from the pedestal voltage to the white-peak voltage, respective output setting voltages $V_{o1}$ to $V_{o4}$ can be selected in proportion to frequencies of appearance of signals in a plurality of (e.g., four) divided ranges of luminance signals. Therefore, contrast can be controlled in response to the present luminance signals, and thereby high contrast images can be obtained. Further, only by keeping the maximum output setting voltage ($=V_{o4}$) equal to or under a voltage which causes blooming, the generation of undesirable blooming is suppressed.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A gradient adjusting circuit comprising:
   a first differential amplifier including a first setting transistor and a second setting transistor, said first setting transistor having a base to which a first input setting voltage ($V_{i0}(=V_p)$) is input, said second setting transistor having a base to which a second input setting voltage ($V_{i1}$) is input and an emitter connected to a first resistor;
   a current mirror circuit connected to a collector of said second setting transistor;
   an adjusting current generation circuit connected to said current mirror circuit for issuing an adjusting current based on an output current of said current mirror circuit;
   a first output resistor, a first end of which is connected to said base of said second setting transistor and a second end of which receives said adjusting current;
   an operational amplifier for comparing a voltage at said second end of said first output resistor with a first output setting voltage ($V_{o1}$), said operational amplifier feeding back an output signal to said adjusting current generation circuit;
   a second differential amplifier including a first signal transistor and a second signal transistor, said first signal transistor having an emitter to which a second resistor having a resistance equal to said first resistor is connected and a base to which an input signal is connected, said second signal transistor having a base to which said first input setting voltage ($V_p$) is input;
   a signal current mirror circuit connected to a collector of said first signal transistor;
   a gradient adjusting current generation circuit connected to said signal current mirror circuit for issuing a signal adjusting current based on an output current of said signal current mirror circuit, said gradient adjusting current generation circuit receiving an output signal fed-back from said operational amplifier wherein a gradient of input to output in a range from said first input setting voltage ($V_p$) to said second input setting voltage ($V_{i1}$) is given by a value of $(V_{o1}-V_p)/(V_{i1}-V_p)$; and
   a signal output resistor having a first end receiving said input signal and a second end receiving said signal adjusting current.

2. A tone control circuit comprising N gradient adjusting circuits, wherein an M-th ($1 \leq M \leq N$) gradient adjusting circuit comprises:
   a first differential amplifier including a first setting transistor and a second setting transistor, said first setting transistor having a base to which an M-th input setting voltage ($V_{i(M-1)}$) is input, said second setting transistor having a base to which an (M+1)-th input setting voltage ($V_{iM}$) is input and an emitter connected to a first resistor;
   N−M+1 current mirror circuits connected to a collector of said second setting transistor, each of said N−M+1 current mirror circuits having an output current;
   N−M+1 adjusting current generation circuits connected respectively to said N−M+1 current mirror circuits generating adjusting currents based on said output currents of said current mirror circuits;
   a first output resistor having a first end connected to said base of said second transistor and a second end receiving said adjusting current from one of said N−M+1 adjusting current generation circuits and a predetermined adjusting current from an adjusting current generation circuits of another gradient adjusting circuits when a value of said M is equal to or larger than 2;
   an operational amplifier for comparing a voltage at said second end of said first output resistor with an (M+1)-th output setting voltage ($V_{oM}$), said operational amplifier feeding back an output signal to said adjusting current generation circuits;
   a second differential amplifier including a first signal transistor and a second signal transistor, said first signal transistor having an emitter to which a second resistor having a resistance equal to said first resistor is connected and a base to which an input signal is connected, said second signal transistor having a base to which a first input setting voltage ($V_{i0}(=V_p)$) is input;
   a signal current mirror circuit connected to a collector of said first signal transistor;
   a gradient adjusting current generation circuit connected to said signal current mirror circuit for issuing a signal adjusting current based on an output current of said signal current mirror circuit, said gradient adjusting current generation circuit receiving an output signal fed-back from said operational amplifier wherein a gradient of input to output in a range from said M-th input setting voltage ($V_{i(M-1)}$) to said (M+1)-th input setting voltage ($V_{iM}$) is given by a value of ($V_{oM}-V_{o(M-1)}$)/($V_{iM}-V_{i(M-1)}$); and a signal output resistor having a first end receiving said input signal and a second end receiving said signal adjusting current.

3. A gradient adjusting circuit in accordance with claim 1, wherein a resistance of said first output resistor is equal to a resistance of said signal output resistor.

4. A tone control circuit in accordance with claim 2, wherein a resistance of said first output resistor is equal to a resistance of said signal output resistor.

5. A tone control circuit in accordance with claim 2, wherein respective intervals of said input setting voltages ($V_{i(M-1)}$, $V_{iM}$) are equal to each other.

6. A tone control circuit in accordance with claim 2, wherein an interval from one of said input setting voltages ($V_p$, - - - , $V_{iM}$) to another of said input setting voltages is an integer multiple of an interval from a predetermined input setting voltage ($V_{i(M-1)}$) to the next input setting voltage ($V_{iM}$).

7. A tone control circuit in accordance with claim 2, wherein respective input setting voltages ($V_p$, - - - , $V_{iN}$) are obtained by equally dividing a maximum signal amplitude of said input signal.

8. A tone control circuit in accordance with claim 2, wherein a differential voltage between an M-th output setting voltage and an (M+1)-th output setting voltage has a value proportional to a frequency of appearance of signals which are in a range from an M-th input setting voltage to an (M+1)-th input setting voltage.

9. A tone control circuit in accordance with claim 7, wherein a maximum output setting voltage is equal to or lower than a voltage which causes blooming.

10. A tone control circuit comprising:

a plurality of gradient adjusting circuits each comprising:
 (a) an adjusting current generation means for receiving a first input setting voltage and a second input setting voltage;
 (b) an adding means for adding an output current of said adjusting current generation means and a predetermined output current supplied from an adjusting current generation means of another gradient adjusting circuit;
 (c) a resistive means through which said first input setting voltage flows;
 (d) a comparing means for comparing an output of said adding means and said first input setting voltage with a predetermined output setting voltage and for generating a control voltage to said adjusting current generation means to thereby equalize said input voltage with said output setting voltage; and
 (e) a gradient adjusting current generation means, connected to said comparing means, for issuing an output current in response to said control voltage; and a summation means for summing said gradient adjusting current generation means output current for each of said plurality of gradient adjusting circuits.

* * * * *